Dec. 12, 1967   B. HOFMANN ETAL   3,358,163
ELECTRODES FOR MAGNETOHYDRODYNAMIC GENERATORS
Filed July 21, 1964
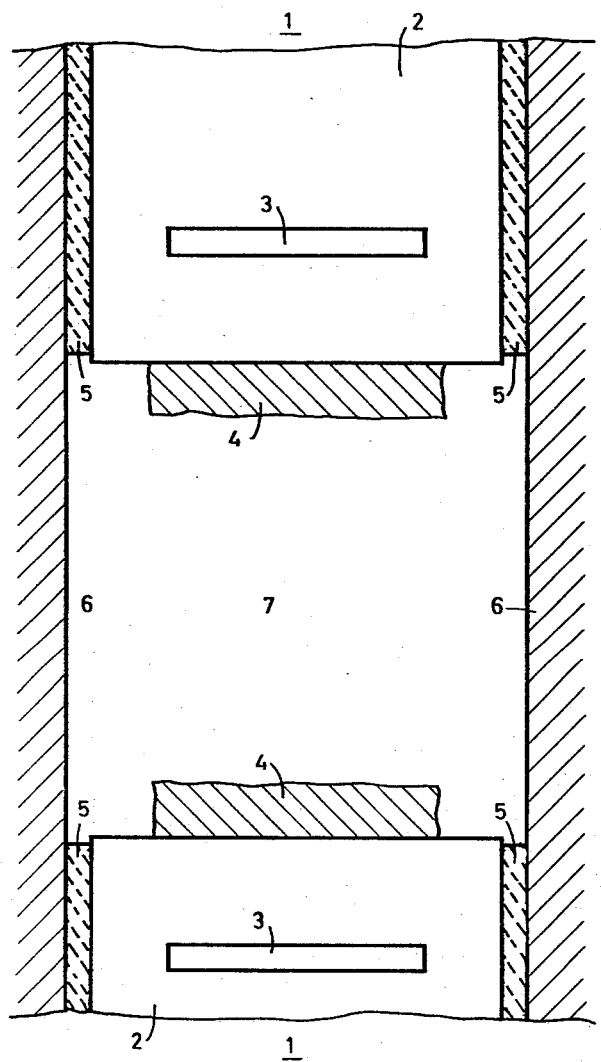

United States Patent Office 3,358,163
Patented Dec. 12, 1967

3,358,163
ELECTRODES FOR MAGNETOHYDRODYNAMIC
GENERATORS
Bernhard Hofmann, Erlangen-Bruck, and Hans Keil, Erlangen, Germany, assignors to Siemens-Schuckertwerke Aktiengesellschaft, Berlin-Siemensstadt, Germany, a corporation of Germany
Filed July 21, 1964, Ser. No. 384,173
Claims priority, application Germany, Aug. 2, 1963,
S 86,505
3 Claims. (Cl. 310—11)

ABSTRACT OF THE DISCLOSURE

Pair of electrodes in MHD generator, each having a face spaced from and opposite the other defining plasma flow passage therebetween. Each of the faces has a central region and adjacent marginal regions, the central region being raised relative to the respective marginal regions so that the width of the passage between both central regions is less than between the respective marginal regions. The raised region can be formed by a layer of weld metal applied to the central region of each electrode. The raised central regions of the electrode pair can have a combined height relative to their respective marginal regions that is substantially ten percent of the width of the passage between the respective marginal regions of the faces.

---

Our invention relates to electrodes for magnetohydrodynamic generators, also known as MHD generators.

An MHD generator generally operates with a high temperature plasma rapidly flowing through a channel. The plasma often heated to 3000° C. can consist of gaseous combustion products that are thermally dissociated at these temperatures when a seed material is added thereto. An electric field perpendicular to an applied magnetic field and to the plasma flow is induced in the plasma. A utilizable electromotive force is produced between the electrodes that are located in the channel in the plane of this electric field. An MHD generator of this general type is shown and described in the publication, "Power," of November 1959, p. 62 ff.

The channel walls of the generator between the electrodes must be constructed of electrically insulating material. The combined structural unit of channel walls and electrodes are hereinafter referred to as a generator channel.

The construction material for the generator channel that is subjected to the combustion gases must be able to withstand the high temperatures and oxidizing atmosphere of the plasma. It is possible to construct the entire channel of high grade steel and to provide the same with water cooling ducts, the channel walls being separated from the electrodes by an electrically insulating cement layer. It is accordingly expedient to regulate the surface temperature of the electrodes with a medium such as water flowing through the cooling ducts so that the surface temperature remains just below the melting point of the material of the electrodes.

It is rather difficult however to maintain the plasma at an exactly constant temperature. If the temperature were momentarily to increase slightly, the outer surface of the electrode would melt and thereby form drops or beads of electrode material which can short-circuit the electrically insulating cement layer between the electrodes and walls. If the temperature on the other hand should drop for a short period so that the temperature of the seed material such as potassium carbonate for example, falls below its vaporization point, the seed material then deposits a liquid film on the electrodes and impedes the current flow due to the increased resistance to transfer between the electrodes and the plasma.

It is accordingly an object of our invention to provide electrodes for magnetohydrodynamic generators which avoid the aforementioned disadvantages of the known electrodes.

To this end and in accordance with our invention, we provide an electrode having a central region that is raised with respect to the marginal regions thereof.

In accordance with a further aspect of our invention, the electrodes are raised on substantially two-thirds of their surface with respect to the marginal regions thereof to a height which is substantially 10% of the width of a plasma flow passage between the adjacent marginal regions of a pair of electrodes. For larger channels with distances between the electrodes that are greater than the centimeter range, i.e., in the decimeter range for example, this percentage value can be smaller. One can also expect favorable characteristics from the multi-stage transitions from the marginal regions to the middle region, that is by a stepwise increase in elevation, for example.

Since we have found that a roughened or irregular surface of the raised portion of the electrode is more favorable than a smooth surface, we provide as an additional aspect of our invention several welding tracks or layers effected by means of deposition welding. High-temperature resistant and non-magnetic high-grade steel such as chrome-nickel-steels are suitable as the deposited weld material. The non-magnetic characteristic is advantageous to avoid losses due to strain or scattering of the magnetic field.

Other features which are considered as characteristic for the invention are set forth in the appended claims.

Although the invention has been illustrated and described as embodied in electrodes for magnetohydrodynamic generators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will best be understood from the following description of a specific embodiment when read in connection with the single figure of the accompanying drawing which is a schematic view of the electrode constructed in accordance with our invention.

In the figure there is shown a recangular or box-shaped experimental MHD channel in cross section wherein the outer electrodes 1 and the wall portions 6 are broken away. The electrodes 1 and the wall portions 6 enclose the plasma flow space 7. The electrodes 1 consist of a block 2 of chrome-nickel-steel such as is known in the trade as Thermax 11a, in which a cooling duct 3 is provided. The spacing between the opposing blocks 2 is, for example, 2 cm. The electrodes have a raised portion on substantially two-thirds of their opposing surfaces. To produce this raised construction, several welding strips 4 with a thickness of 2 to 3 mm. can be applied to the sides of the electrodes that face the plasma flow passage 7 by means of deposition welding, for example with deposition welding electrodes of the type Fox FFB. The thickness of the welding strips 4 together take up substantially 10% of the space between the electrodes 2. After the welding strips are applied to the electrodes, they are not thereafter treated or handled. The channel walls 6 that are made of steel are electrically insulated from the electrodes by cement layers 5 that are 2 mm. thick, for example. If the walls are made of insulating material then the cement layers are unnecessary and the walls and electrodes can be directly connected to each other.

It is of course understood that the scope of our invention also encompasses the application of the foregoing to cylindrical electrodes.

We have observed in an experimental channel that the raised electrode regions extend glowingly into the plasma whereas in the marginal regions, seed material (potassium carbonate in this experiment) precipitates as a liquid. This produces several advantages: resistance to transfer between the electrodes and the plasma is small so that the efficiency of the MHD generator is increased by about 20% more than that of flat electrodes, i.e., without raised regions.

The temperatures in the marginal regions of the electrodes can be maintained at such a low value that no short-circuiting can occur. The seed material which separates as a liquid thereby increases the insulating effect of the cement layer between the electrodes and the rest of the walls. The generator is consequently not sensitive to instabilities of the plasma temperature for optimum operation. The increased efficiency achieved by the electrodes constructed in accordance with our invention is ensured also by the influence it exerts on the plasma current.

We claim:

1. In a magnetohydrodynamic generator, a pair of electrodes each having a face spaced from and opposite to the other, said faces defining a plasma flow passage therebetween, each of said faces having a central region and adjacent marginal regions, said central region being raised relative to the respective marginal regions so that the width of the passage between both said central regions is less than between the respective marginal regions of said faces, said raised central regions having a combined height relative to their respective marginal regions which is substantially ten percent of the width of the passage between the respective marginal regions of said faces.

2. In a magnetohydrodynamic generator, a pair of electrodes each having a face spaced from and opposite to the other said faces defining a plasma flow passage therebetween each of said faces having a central region and adjacent marginal regions, said central region being substantially two-thirds the area of the respective face and raised relative to the respective marginal regions so that the width of the passage between both said central regions is less than between the respective marginal regions of said faces, said raised central regions having a combined height relative to their respective marginal regions which is substantially ten percent of the width of the passage between the respective marginal regions of said faces.

3. In a magnetohydrodynamic generator, a pair of electrode members each having a surface oppositely spaced from the other, said surfaces defining a plasma flow passage therebetween, each of said surfaces having a central region and adjacent marginal regions, a layer of weld metal applied to the central region of each electrode member and forming an integral electrode with said electrode member, the weld metal layers of said electrodes extending into said passage toward each other whereby the width of the passage between said layers is less than between the respective marginal regions of said electrode surfaces.

References Cited

UNITED STATES PATENTS

| | | | |
|---|---|---|---|
| 1,196,511 | 8/1916 | Borger | 310—11 |
| 3,274,408 | 9/1966 | Louis | 310—11 |

OTHER REFERENCES

Publication: Engineering Aspects of Magnetohydrodynamics; Proceedings of the Second Symposium at Philadelphia, March 1961, edited by Mannal and Mather, pp. 25 to 27.

MILTON O. HIRSHFIELD, *Primary Examiner.*

D. X. SLINEY, *Assistant Examiner.*